United States Patent
Shimotakahara (10) Patent No.: US 7,593,612 B2
(45) Date of Patent: Sep. 22, 2009

(54) OPTICAL FIBER

(75) Inventor: Iwao Shimotakahara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 34 days.

(21) Appl. No.: 11/868,222

(22) Filed: Oct. 5, 2007

(65) Prior Publication Data

US 2008/0285929 A1    Nov. 20, 2008

(30) Foreign Application Priority Data

Oct. 19, 2006    (JP) ............................. 2006-285021

(51) Int. Cl.
    *G02B 6/036*    (2006.01)
(52) U.S. Cl. ..................................... 385/128
(58) Field of Classification Search .......... 385/127–128
    See application file for complete search history.

(56) References Cited

U.S. PATENT DOCUMENTS 6,917,740 B2    7/2005    Boek et al.

2005/0089289 A1 *    4/2005    Hayami et al. .............. 385/127

FOREIGN PATENT DOCUMENTS

JP    2001-91782    4/2001

* cited by examiner

*Primary Examiner*—Jerry T Rahll
(74) *Attorney, Agent, or Firm*—Oblon, Spivak, McClelland, Maier & Neustadt, L.L.P.

(57) ABSTRACT

A tension-absorbing cladding layer is formed around a cladding layer, with a refractive index equal to that of a center core region or higher. The center core region has a relative refractive index difference of −0.1% to 0% with respect to a pure silica glass, a chlorine concentration of wt % to 0.10 wt %, and a fluorine concentration of 0.10 wt % to 0.30 wt %. The tension-absorbing cladding layer has a relative refractive index difference of 0% to 0.05% with respect to the pure silica glass and a chlorine concentration of 0.15 wt % or lower. A ratio of an outer diameter of the tension-absorbing cladding layer to an outer diameter of the cladding layer is 1.10 to 1.40.

3 Claims, 6 Drawing Sheets

|  | λc | Aeff | BENDING LOSS |
|---|---|---|---|
| INCREASE Δ3 | DECREASE | INCREASE | INCREASE |
| INCREASE (Δ3-Δ2) | INCREASE | INCREASE | DECREASE |
| INCREASE 2b/2a | DECREASE | INCREASE | DECREASE |

FIG.7

| UNIT | Δ1 % | Δ3 % | Δ3-Δ2 % | Δ4 % | 2a μm | 2d μm | 2b/2a | 2d/2c | CENTER CORE REGION Cl CONCENTRATION wt% | CENTER CORE REGION F CONCENTRATION wt% | TENSION-ABSORBING CLADDING LAYER Cl CONCENTRATION wt% |
|---|---|---|---|---|---|---|---|---|---|---|---|
| FIRST EMBODIMENT EXAMPLE | -0.03 | -0.27 | 0.07 | 0.02 | 12.5 | 125 | 4.1 | 1.20 | 0.06 | 0.21 | 0.10 |
| SECOND EMBODIMENT EXAMPLE | -0.04 | -0.30 | 0.09 | 0.03 | 11.7 | 125 | 3.5 | 1.25 | 0.03 | 0.28 | 0.12 |
| THIRD EMBODIMENT EXAMPLE | -0.03 | -0.33 | 0.12 | 0.03 | 11.5 | 125 | 3.8 | 1.26 | 0.08 | 0.15 | 0.13 |
| FOURTH EMBODIMENT EXAMPLE | -0.03 | -0.38 | 0.09 | 0.02 | 11.4 | 125 | 3.6 | 1.22 | 0.06 | 0.23 | 0.08 |
| FIFTH EMBODIMENT EXAMPLE | -0.03 | -0.34 | 0.03 | 0.04 | 11.7 | 125 | 3.9 | 1.25 | 0.07 | 0.18 | 0.10 |
| SIXTH EMBODIMENT EXAMPLE | -0.02 | -0.29 | 0.11 | 0.03 | 11.7 | 125 | 2.2 | 1.23 | 0.05 | 0.23 | 0.11 |
| FIRST COMPARISON EXAMPLE | -0.02 | -0.31 | 0.10 | 0.02 | 11.8 | 125 | 3.3 | 1.25 | 0.13 | 0.19 | 0.11 |
| SECOND COMPARISON EXAMPLE | -0.04 | -0.28 | 0.08 | 0.03 | 12.3 | 125 | 4.3 | 1.19 | 0.07 | 0.38 | 0.14 |
| THIRD COMPARISON EXAMPLE | -0.03 | -0.33 | 0.07 | 0.02 | 12.0 | 125 | 3.1 | 1.28 | 0.04 | 0.22 | 0.16 |
| FOURTH COMPARISON EXAMPLE | -0.04 | -0.30 | 0.12 | 0.02 | 11.9 | 125 | 4.0 | 1.06 | 0.06 | 0.22 | 0.12 |
| FIFTH COMPARISON EXAMPLE | -0.04 | -0.31 | 0.10 | 0.02 | 11.5 | 125 | 3.7 | 1.45 | 0.04 | 0.27 | 0.14 |

FIG.8

| WAVELENGTH | TRANSMISSION LOSS | | λc | Aeff | BENDING LOSS | PMD |
|---|---|---|---|---|---|---|
| | 1550 nm | 1380 nm | | 1550 nm | 1550 nm | |
| UNIT | dB/km | dB/km | nm | $\mu m^2$ | dB/m | $ps/km^{1/2}$ |
| FIRST EMBODIMENT EXAMPLE | 0.172 | 0.421 | 1528 | 116 | 4.0 | 0.04 |
| SECOND EMBODIMENT EXAMPLE | 0.174 | 0.408 | 1538 | 109 | 1.3 | 0.06 |
| THIRD EMBODIMENT EXAMPLE | 0.175 | 0.398 | 1541 | 104 | 0.5 | 0.04 |
| FOURTH EMBODIMENT EXAMPLE | 0.174 | 0.408 | 1548 | 91 | 0.3 | 0.03 |
| FIFTH EMBODIMENT EXAMPLE | 0.172 | 0.393 | 1518 | 94 | 1.3 | 0.08 |
| SIXTH EMBODIMENT EXAMPLE | 0.174 | 0.399 | 1533 | 93 | 2.6 | 0.07 |
| FIRST COMPARISON EXAMPLE | 0.186 | 0.389 | 1542 | 106 | 0.8 | 0.08 |
| SECOND COMPARISON EXAMPLE | 0.185 | 0.414 | 1525 | 111 | 1.1 | 0.05 |
| THIRD COMPARISON EXAMPLE | 0.184 | 0.400 | 1531 | 104 | 1.0 | 0.07 |
| FOURTH COMPARISON EXAMPLE | 0.182 | 0.419 | 1508 | 106 | 1.0 | 0.11 |
| FIFTH COMPARISON EXAMPLE | 0.182 | 0.398 | 1533 | 105 | 2.2 | 0.09 |

OPTICAL FIBER

BACKGROUND OF THE INVENTION

1. Field of the Invention

The present invention relates to an optical fiber for a long-haul optical transmission system.

2. Description of the Related Art

With an increase of an amount of communication information, a wavelength-division-multiplexing (WDM) transmission is widely used in a field of communication, using an optical signal in a wavelength band centering around 1550 nanometers where a lowest transmission loss can be expected in a silica-glass-based optical fiber. The WDM transmission is a system transmitting a plurality of optical signals of different wavelengths through a single optical fiber.

In the WDM transmission, major factors restricting a long-distance transmission of the optical signal with a high speed include a transmission loss of the optical fiber, a wavelength dispersion, and a nonlinearity. If the transmission loss is high, degradation of the optical signal becomes large, which restricts a transmission distance. Factors that cause the transmission loss include a Rayleigh scattering, a scattering due to a structural defect in a core, and optical absorption due to impurities, such as a hydroxyl (OH) group, in the core.

A conventional optical fiber has a refractive index profile designed to confine an optical signal in the core for propagating the optical signal by doping germanium (Ge), which is a dopant for increasing a refractive index, into the core to provide a refractive index difference between the core and a cladding formed with a silica glass without a dopant (pure silica glass). On the other hand, as an optical fiber for realizing a low transmission loss, an F-doped-cladding fiber is known in which a refractive index profile is employed which provides a refractive index difference between the core and the cladding by decreasing the refractive index of the cladding by doping fluorine (F), which is a dopant for decreasing the refractive index, into the cladding while maintaining the refractive index of the core as the refractive index of the pure silica glass without doping virtually any dopant into the core. Because there is virtually no dopant doped in the core, the F-doped-cladding fiber can lower the transmission loss caused by the dopant, which is an impurity, compared to the optical fiber having a Ge-doped core.

However, viscosity of the silica glass becomes low if a dopant such as F and Ge is doped. As a result, in the case of the F-doped-cladding fiber, a stress at the time of drawing is concentrated on the core that includes virtually no dopant, so that the stress is remained in the core, resulting in an occurrence of a structural defect. The structural defect that has occurred in such a manner becomes a cause of the transmission loss. To reduce the residual stress in the core, a method is disclosed in U.S. Pat. No. 6,917,740, in which a low transmission loss is obtained by reducing a glass transition temperature difference by adjusting a concentration of a dopant such as F and chlorine (Cl) in the core and an F-doped cladding layer that is adjacent to the core to match the viscosities of the core and the F-doped cladding layer. In U.S. Pat. No. 6,917,740, a transmission loss of 0.18 dB/km is disclosed.

When the wavelength dispersion is larger, a waveform distortion of a propagating optical signal is increased with a consequent result that a high-speed transmission cannot be achieved. On the other hand, if the wavelength dispersion reaches zero, a four-wave mixing (FWM), which is one of the nonlinear optical phenomena, occurs, so that the WDM transmission becomes difficult.

To cope with the above problems, as a means for suppressing a negative effect due to both the wavelength dispersion and the nonlinear optical phenomena, a dispersion-compensating optical transmission path is disclosed in Japanese Patent Application Laid-Open No. 2001-91782, in which the wavelength dispersion becomes close to zero on an entire optical transmission path by forming the optical transmission path by connecting two types of optical fibers including an optical fiber having a positive dispersion in a transmission band of the optical signal and an optical fiber having a negative dispersion. In the dispersion-compensating optical transmission path, an occurrence of the nonlinear optical phenomena is suppressed by employing an optical fiber having a large effective core area, for example, 75 $\mu m^2$, at a stage preceding an optical transmission path to which a high-power optical signal is input.

However, because a high transmission loss not only restrict the transmission distance but also necessitates to increase output power of an optical amplifier for compensating the transmission loss, there are such problems that a cost of the entire optical transmission system is increased and the nonlinear phenomena occurs with ease. These problems become increasingly prominent with an increase of the number of optical signals and an increase of the transmission distance in the WDM transmission. Therefore, for achieving an even higher performance of the optical transmission system, an optical fiber having a lower transmission loss is highly demanded.

SUMMARY OF THE INVENTION

It is an object of the present invention to at least partially solve the problems in the conventional technology.

An optical fiber according to one aspect of the present invention includes a center core region; a cladding layer formed around the center core region, which has a refractive index lower than a refractive index of the center core region; and a tension-absorbing cladding layer formed around the cladding layer, which has a refractive index equal to or higher than the refractive index of the center core region. The center core region has a relative refractive index difference $\Delta 1$ of −0.1% to 0% with respect to a pure silica glass, a chlorine concentration of 0 wt % to 0.10 wt %, and a fluorine concentration of 0.10 wt % to 0.30 wt %. The tension-absorbing cladding layer has a relative refractive index difference $\Delta 4$ of 0% to 0.05% with respect to the pure silica glass and a chlorine concentration of equal to or lower than 0.15 wt %. A ratio of an outer diameter of the tension-absorbing cladding layer to an outer diameter of the cladding layer is 1.10 to 1.40.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical fiber according to the present invention are explained in detail below with reference to the accompanying drawings. It should be noted that the present invention is not limited to the exemplary embodiments. A cutoff wavelength ($\lambda c$) described in the specification indicates the fiber cutoff wavelength defined by the ITU-T (International Telecommunications Union Telecommunication Standardization) G. 650.1. Other terms not specifically defined in the specification conform to the definitions and the measurement methods in ITU-T G. 650.1 and G. 650.2.

Figure 1:
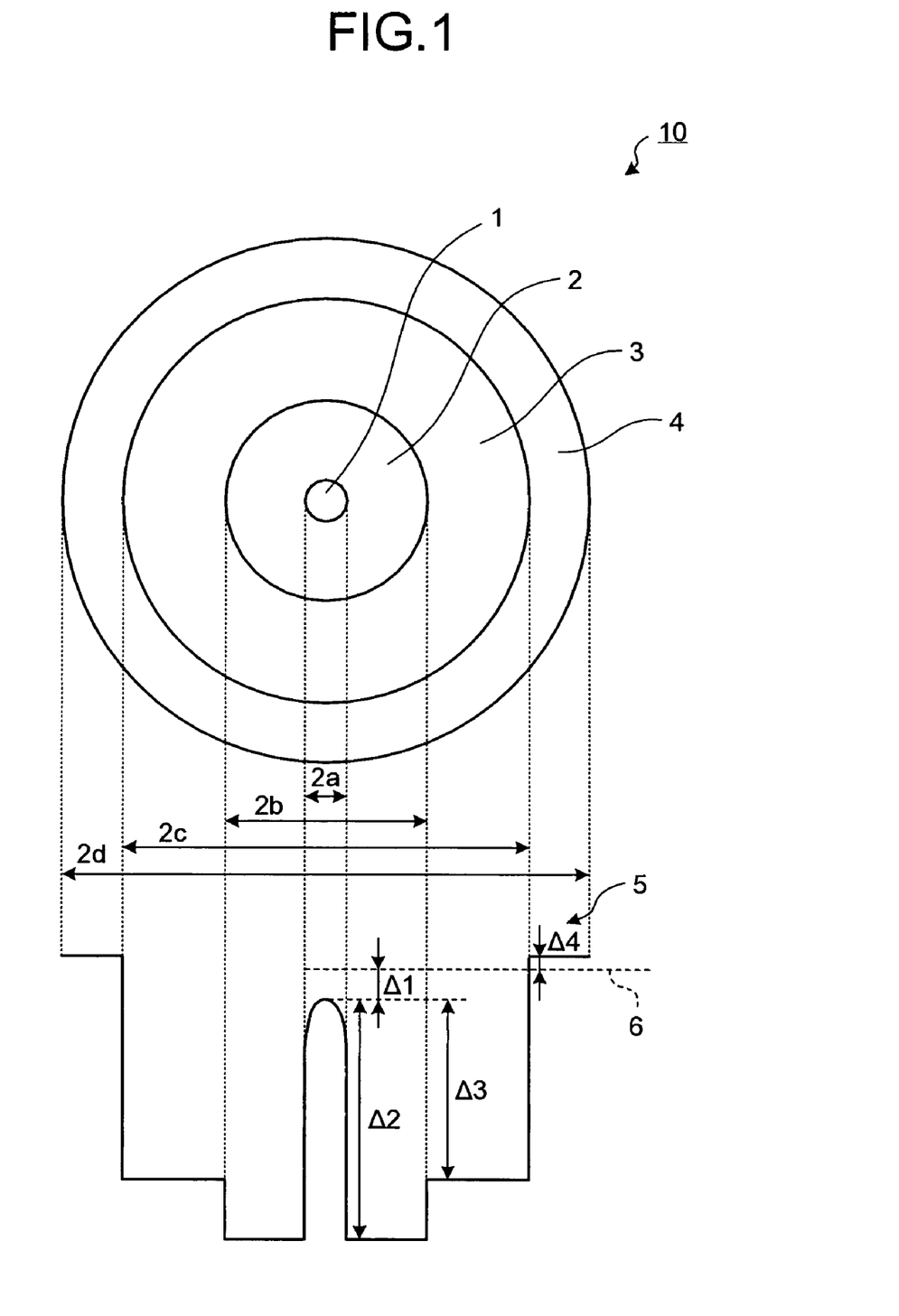
FIG. 1 is a schematic diagram for illustrating a refractive index profile of a cross section of an optical fiber according to an embodiment of the present invention.

FIG. 1 is a schematic diagram for illustrating a refractive index profile of a cross section of an optical fiber 10 according to an embodiment of the present invention. As shown in FIG. 1, the optical fiber 10 includes a center core region 1 having a diameter $2a$, a cladding layer 3 formed around the center core region 1 with a refractive index lower than a refractive index of the center core region 1 and an outer diameter $2c$, and a tension-absorbing cladding layer 4 formed around the cladding layer 3 with a refractive index equal to or higher than the refractive index of the center core region 1 and an outer diameter $2d$. The optical fiber 10 further includes an inner cladding layer 2 that is formed between the center core region 1 and the cladding layer 3 with a refractive index lower than the refractive index of the cladding layer 3 and an outer diameter $2b$, having a so-called W-type refractive index profile 5. A reference numeral 6 indicates a refractive index level of a pure silica glass.

The center core region 1 has a relative refractive index difference $\Delta 1$ of $-0.1\%$ to $0\%$ with respect to the pure silica glass, a chlorine concentration of 0 wt % to 0.10 wt %, and a fluorine concentration of 0.10 wt % to 0.30 wt %. The tension-absorbing cladding layer 4 has a relative refractive index difference $\Delta 4$ of 0% to 0.05% with respect to the pure silica glass and a chlorine concentration of equal to or lower than 0.15 wt %. A ratio of the outer diameter $2d$ of the tension-absorbing cladding layer 4 to the outer diameter $2c$ of the cladding layer 3 ($2d/2c$) is 1.10 to 1.40

A relative refractive index difference of the inner cladding layer 2 with respect to the center core region 1 is $\Delta 2$, and a relative refractive index difference of the cladding layer 3 with respect to the center core region 1 is $\Delta 3$. The relative refractive index differences $\Delta 1$ to $\Delta 4$ are defined by $$\Delta 1 = \{(n1-ns)/ns\} \times 100 \qquad (1)$$

$$\Delta 2 = \{(n2-n1)/n1\} \times 100 \qquad (2)$$

$$\Delta 3 = \{(n3-n1)/n1\} \times 100 \qquad (3)$$

$$\Delta 4 = \{(n4-ns)/ns\} \times 100 \qquad (4)$$

where n1 is the maximum refractive index of the center core region 1, n2 is the minimum refractive index of the inner cladding layer 2, n3 is the maximum refractive index of the cladding layer 3, the n4 is the maximum refractive index of the tension-absorbing cladding layer 4, and ns is the refractive index of the pure silica glass.

The diameter $2a$ of the center core region 1 is a diameter at a position corresponding to ½ of $\Delta 2$, the outer diameter $2b$ of the inner cladding layer 2 is a diameter at a position corresponding to ½ of ($\Delta 3 - \Delta 2$), the outer diameter $2c$ of the cladding layer 3 is a diameter at a position corresponding to ½ of $\Delta 3$, and the outer diameter $2d$ of the tension-absorbing cladding layer 4 is the same as an outer diameter of the optical fiber 10.

With the optical fiber 10 according to the present embodiment, because the center core region 1 has the relative refractive index difference $\Delta 1$ of $-0.1\%$ to $0\%$ with respect to the pure silica glass, the chlorine concentration of 0 wt % to 0.10 wt %, and the fluorine concentration of 0.10 wt % to 0.30 wt %, so that an amount of impurities is small, the transmission loss due to the impurities can be reduced. Furthermore, because the inner cladding layer 2 and the cladding layer 3 have refractive indexes lower than the refractive index of the center core region 1, it is possible to confine an optical signal in the center core region 1 to propagate the optical signal. At the same time, because a glass transition temperature is decreased when drawing an optical fiber preform, a possibility of an occurrence of a structural defect is reduced, making it possible to reduce the transmission loss due to the structural defect. Meanwhile, viscosities of the inner cladding layer 2 and the cladding layer 3 are low because the inner cladding layer 2 and the cladding layer 3 are doped with more F than the center core region 1 to lower the refractive indexes.

On the other hand, because the tension-absorbing cladding layer 4 has the relative refractive index difference $\Delta 4$ of 0% to 0.05% with respect to the pure silica glass and the chlorine concentration of equal to or lower than 0.15 wt %, a viscosity of the tension-absorbing cladding layer 4 becomes an optimal value higher than that of the center core region 1. In addition, the ratio of the outer diameter of the tension-absorbing cladding layer 4 to the outer diameter of the cladding layer 3 is 1.10 to 1.40, which means that the tension-absorbing cladding layer 4 has an enough thickness. As a result, even if the viscosities of the inner cladding layer 2 and the cladding layer 3 are lower than that of the center core region 1, the tension-absorbing cladding layer 4 absorbs a tension at the time of drawing an optical fiber preform, resulting in a suppression of a residual stress in the center core region 1 so that the occurrence of the structural defect in the center core region 1 is further reduced, which makes it possible to obtain an optical fiber having an extremely low transmission loss that is caused by the structural defect. Therefore, the optical fiber 10 according to the present embodiment can realize an extremely low transmission loss of, for example, equal to or lower than 0.50 dB/km at a wavelength of 1380 nanometers and equal to or lower than 0.180 dB/km at a wavelength of 1550 nanometers.

Various parameters defining the refractive index profile 5 of the optical fiber 10 according to the present embodiment are explained in detail below. With the optical fiber 10, a relative refractive index difference $\Delta 3$ of the cladding layer 3 with respect to the center core region 1 is −0.35% to −0.25%, a difference ($\Delta 3 - \Delta 2$) between the relative refractive index difference $\Delta 3$ and the relative refractive index difference $\Delta 2$ is 0.05% to 0.20%, and a ratio of the outer diameter $2b$ of the inner cladding layer 2 to the diameter $2a$ of the center core region 1 is 3.0 to 4.5.

By setting the parameters defining the refractive index profile 5 to the above ranges, the optical fiber 10 according to the present embodiment has a cutoff wavelength of equal to or shorter than 1550 nanometers, an effective core area of equal to or larger than 100 $\mu m^2$ at the wavelength of 1550 nanometers is, a bending loss of equal to or lower than 10 dB/m when the optical fiber is wound 16 times with a diameter of 20 millimeters, and a polarization mode dispersion of equal to or less than 1.0 $ps/km^{1/2}$. In other words, the optical fiber 10 according to the present embodiment has an extremely large effective core area suitable for suppressing the nonlinear phenomena with a low bending loss at the wavelength of 1550 nm, and at the same time, has a practically useful optical property in which a distortion of an optical signal due to the polarization mode dispersion is well suppressed.

Figure 2:
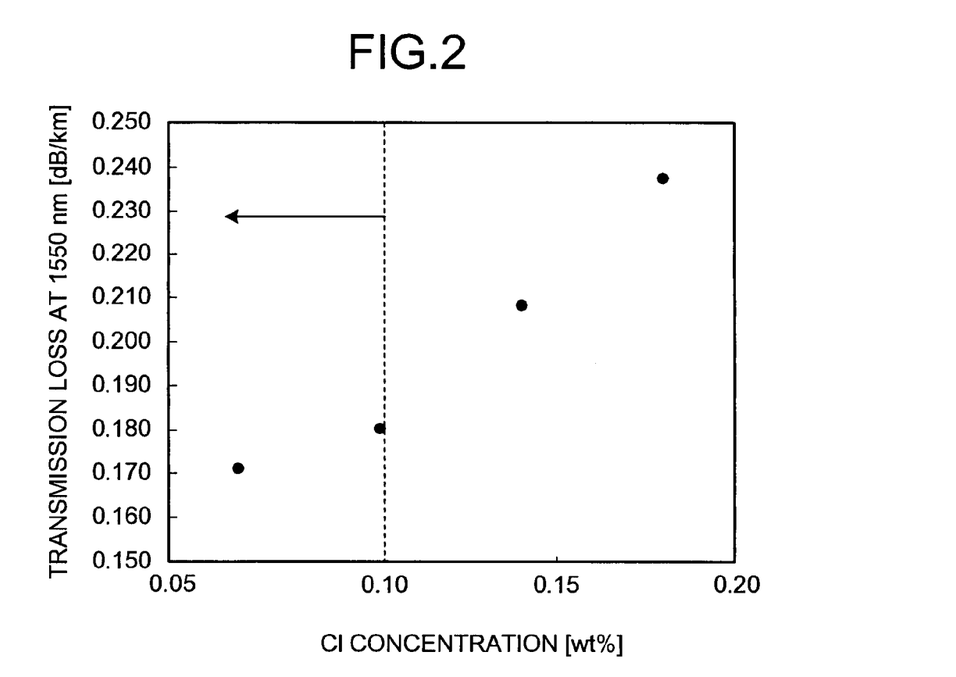
FIG. 2 is a graph representing a transmission loss of an optical fiber having the same structure and the same refractive index profile as the optical fiber according to the present embodiment but a different chlorine concentration in a center core region at a wavelength of 1550 nanometers.

The chlorine concentration and the fluorine concentration of the optical fiber 10 according to the present embodiment are explained in detail below referring to experimental results. FIG. 2 is a graph representing a transmission loss of an optical fiber having the same structure and the same refractive index profile as the optical fiber 10 according to the present embodiment but a different chlorine concentration in a center core region at the wavelength of 1550 nanometers. The parameters defining the refractive index profile of each optical fiber, $\Delta 1$, $\Delta 3$, ($\Delta 3 - \Delta 2$), $2b/2a$, and $\Delta 4$, are set to ranges of −0.1% to 0%, −0.35% to −0.25%, 0.05% to 0.20%, 3.0 to 4.5, and 0% to 0.05%, respectively. As shown in FIG. 2, the transmission loss at the wavelength of 1550 nanometers is increased with an increase of the chlorine concentration of the center core region; however, the optical fiber 10 according to the present embodiment has the chlorine concentration of equal to or lower than 0.10 wt % (weight percentage) as indicated by an arrow, so that the transmission loss is suppressed to 0.180 dB/km or lower.

Figure 3:
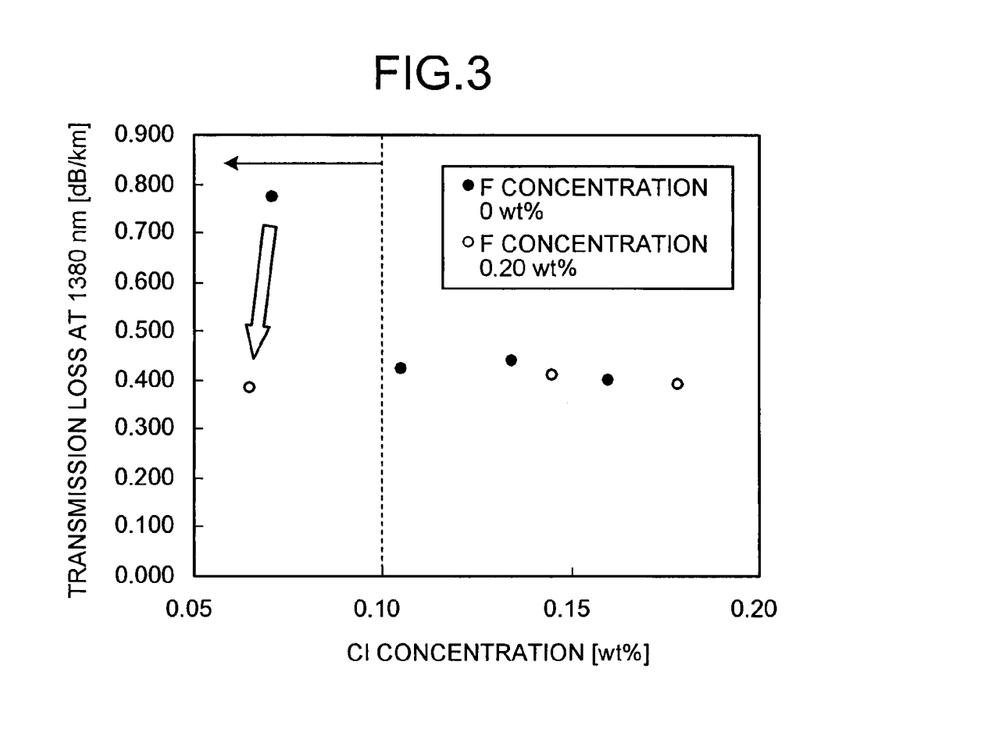
FIG. 3 is a graph representing a transmission loss of an optical fiber having the same structure and the same refractive index profile as the optical fiber according to the present embodiment but a different chlorine concentration in the center core region at a wavelength of 1380 nanometers with fluorine concentrations of 0 wt % and 0.20 wt %.

FIG. 3 is a graph representing a transmission loss of an optical fiber having the same structure and the same refractive index profile as the optical fiber 10 according to the present embodiment but a different chlorine concentration in the center core region at the wavelength of 1380 nanometers with fluorine concentrations of 0 wt % and 0.20 wt %. The structure and the parameters of the refractive index profile of each optical fiber are the same as the case of FIG. 2. As shown in FIG. 3, when the fluorine concentration is 0 wt %, the transmission loss at the wavelength of 1380 nanometers is higher than 0.50 dB/km in an area where the chlorine concentration is low, the reason for which can be explained as follows. A dehydration method for decreasing the OH group having a peak of the optical absorption at the wavelength of 1380 nanometers by a supply of the chlorine at the time of glass sintering at a dehydration process is generally used for a core soot synthesized by the vapor-phase axial deposition (VAD) and the like, which is used for an optical fiber preform. However, at the area shown in FIG. 3 where the chlorine concentration is low, the dehydration is not performed enough to reduce the amount of the OH group at the time of the dehydration process; and therefore, an increase of the transmission loss at the wavelength of 1380 nanometers occurs when the fluorine concentration is 0 wt %.

However, when the fluorine concentration is 0.20 wt %, the amount of the OH group is reduced because the fluorine sufficiently separates —H from the OH group; and as a result, the increase of the transmission loss at the wavelength of 1380 nanometers due to the OH group is well suppressed compared to the case where the fluorine concentration is 0 wt %, as indicated by an arrow.

Figure 4:
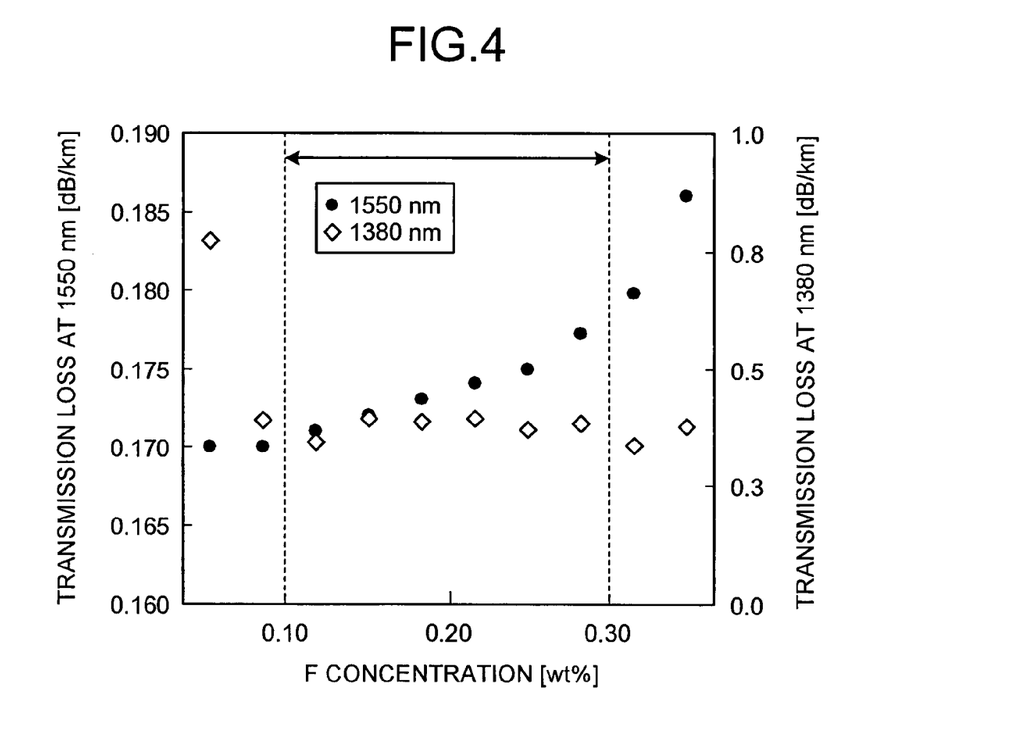
FIG. 4 is a graph representing a transmission loss of an optical fiber having the same structure and the same refractive index profile as the optical fiber according to the present embodiment but a different fluorine concentration in the center core region at the wavelengths of 1550 nanometers and 1380 nanometers with the chlorine concentration of 0.05 wt %.

FIG. 4 is a graph representing a transmission loss of an optical fiber having the same structure and the same refractive index profile as the optical fiber 10 according to the present embodiment but a different fluorine concentration in the center core region at the wavelengths of 1550 nanometers and 1380 nanometers with the chlorine concentration of 0.05 wt %. The structure and the parameters of the refractive index profile of each optical fiber are the same as the cases of FIG. 2 and FIG. 3. As indicated by an arrow shown in FIG. 4, with the optical fiber 10 according to the present embodiment, the transmission loss at the wavelength of 1380 nanometers is equal to or lower than 0.50 dB/km because the fluorine concentration is equal to or higher than 0.10 wt % so that the fluorine sufficiently separates —H from the OH group to reduce the amount of the OH group, and the transmission loss at the wavelength of 1550 nanometers is equal to or lower than 0.180 dB/km because the fluorine concentration is equal to or lower than 0.30 wt % so that an increase of the transmission loss due to the dopant F is well suppressed. In this manner, the optical fiber 10 according to the present embodiment is a highly reliable optical fiber not only having a low transmission loss of equal to or lower than 0.180 dB/km at the wavelength of 1550 nanometers but also having a low transmission loss of equal to or lower than 0.50 dB/km at the wavelength of 1380 nanometers.

Figure 5:
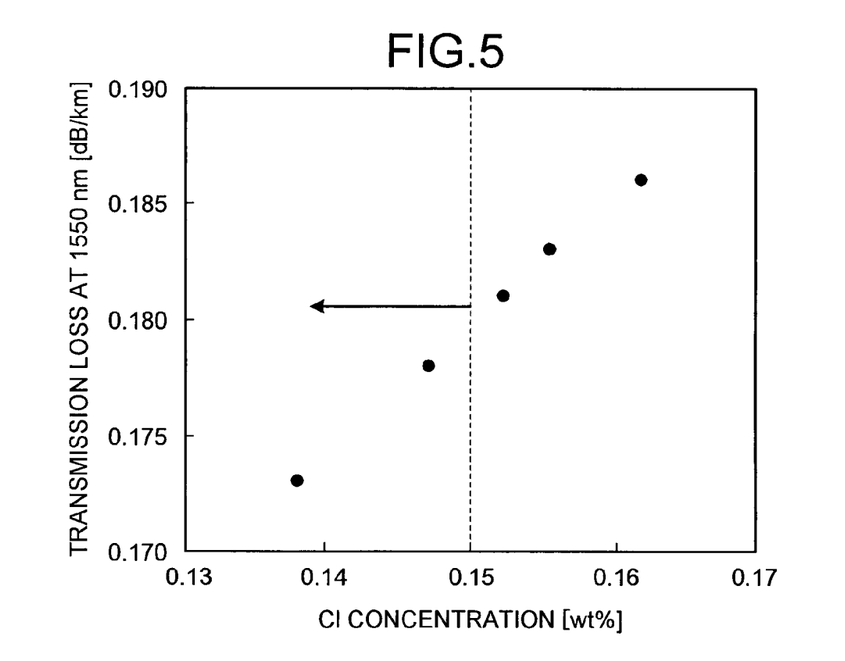
FIG. 5 is a graph representing a transmission loss of an optical fiber having the same structure and the same refractive index profile as the optical fiber according to the present embodiment but a different chlorine concentration in a tension-absorbing cladding layer at the wavelength of 1550 nanometers.

FIG. 5 is a graph representing a transmission loss of an optical fiber having the same structure and the same refractive index profile as the optical fiber according to the present embodiment but a different chlorine concentration in the tension-absorbing cladding layer 4 at the wavelength of 1550 nanometers. The parameters defining the refractive index profile of each optical fiber, $\Delta 1$, $\Delta 3$, ($\Delta 3 - \Delta 2$), $2b/2a$, and $\Delta 4$, are set to ranges of −0.1% to 0%, −0.35% to −0.25%, 0.05% to 0.20%, 3.0 to 4.5, and 0% to 0.05%, respectively, and the center core region has the chlorine concentration of 0 wt % to 0.1 wt % and the fluorine concentration of 0.10 wt % to 0.30 wt %. As indicated by an arrow shown in FIG. 5, the optical fiber 10 according to the present embodiment has the transmission of equal to or lower than 0.180 dB/km at the wavelength of 1550 nanometers because the chlorine concentration is equal to or lower than 0.15 wt % so that the viscosity becomes an optimal value, which is higher than that of the center core region 1.

Figure 6:
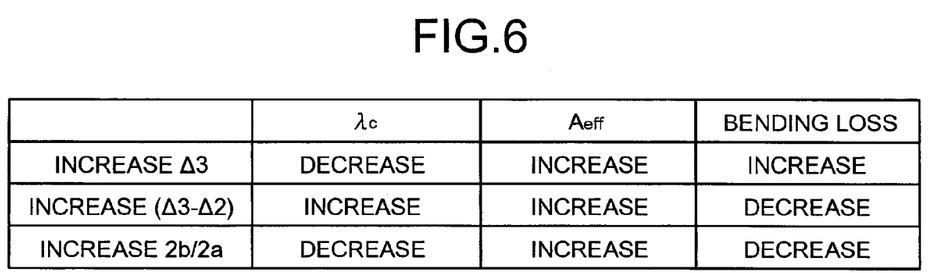
FIG. 6 is a diagram for explaining behaviors of a cutoff wavelength $\lambda_c$, an effective core area $A_{eff}$, and a bending loss, when parameters defining the refractive index profile $\Delta 3$, ($\Delta 3 - \Delta 2$), and $2b/2a$ are respectively increased in the optical fiber according to the present embodiment.

The parameters defining the refractive index profile 5 of the optical fiber 10 according to the present embodiment are explained more specifically below. FIG. 6 is a diagram for explaining behaviors of the cutoff wavelength $\lambda_c$, the effective core area $A_{eff}$, and the bending loss, when the parameters defining the refractive index profile 5, such as Δ3, (Δ3−Δ2), and 2b/2a, are respectively increased.

As shown in FIG. 6, at a predetermined cutoff wavelength, if the relative refractive index difference Δ3 is increased, the optical confinement effect becomes weak, so that the effective core area becomes large and the bending loss becomes high. With the optical fiber 10 according to the present embodiment, because the cutoff wavelength is equal to or shorter than 1550 nanometers and the relative refractive index difference Δ3 is −0.35% to −0.25%, the effective core area is equal to or larger than 100 μm² at the wavelength of 1550 nanometers, and the bending loss is equal to or lower than 10 dB/m when the optical fiber is wound 16 times with a diameter of 20 millimeters.

Furthermore, if (Δ3−Δ2) is increased, the transmission loss is increased because the amount of the dopant F increases. On the other hand, if (Δ3−Δ2) is decreased, the effective core area becomes small because an influence on the optical property of the inner cladding layer 2 becomes small. With the optical fiber 10 according to the present embodiment, because the cutoff wavelength is equal to or shorter than 1550 nanometers and (Δ3−Δ2) is 0.05% to 0.20%, the effective core area is equal to or larger than 100 μm² and the transmission loss is equal to or lower than 0.180 dB/km at the wavelength of 1550 nanometers.

In addition, the effective core area is increased with an increase of the ratio of the outer diameter 2b of the inner cladding layer 2 with respect to the diameter 2a of the center core region 1, 2b/2a. However, too large 2b/2a cannot produce a noticeable effect; instead, a demerit becomes large, such as an increase of the transmission loss and an increase of the cost because the amount of the dopant F is increased due to an increase of a volume of the inner cladding layer 2 where the refractive index is low. On the other hand, if 2b/2a is decreased, the effective core area is decreased because an influence on the optical property of the inner cladding layer 2 becomes small. With the optical fiber 10 according to the present embodiment, because the cutoff wavelength is equal to or shorter than 1550 nanometers and 2b/2a is 3.0 to 4.5, the effective core area is equal to or larger than 100 μm² and the transmission loss is equal to or lower than 0.180 dB/km at the wavelength of 1550 nanometers.

The optical fiber 10 according to the present embodiment is explained more specifically using embodiment examples and comparison examples. The present invention is not limited by the embodiment examples.

Figure 7:
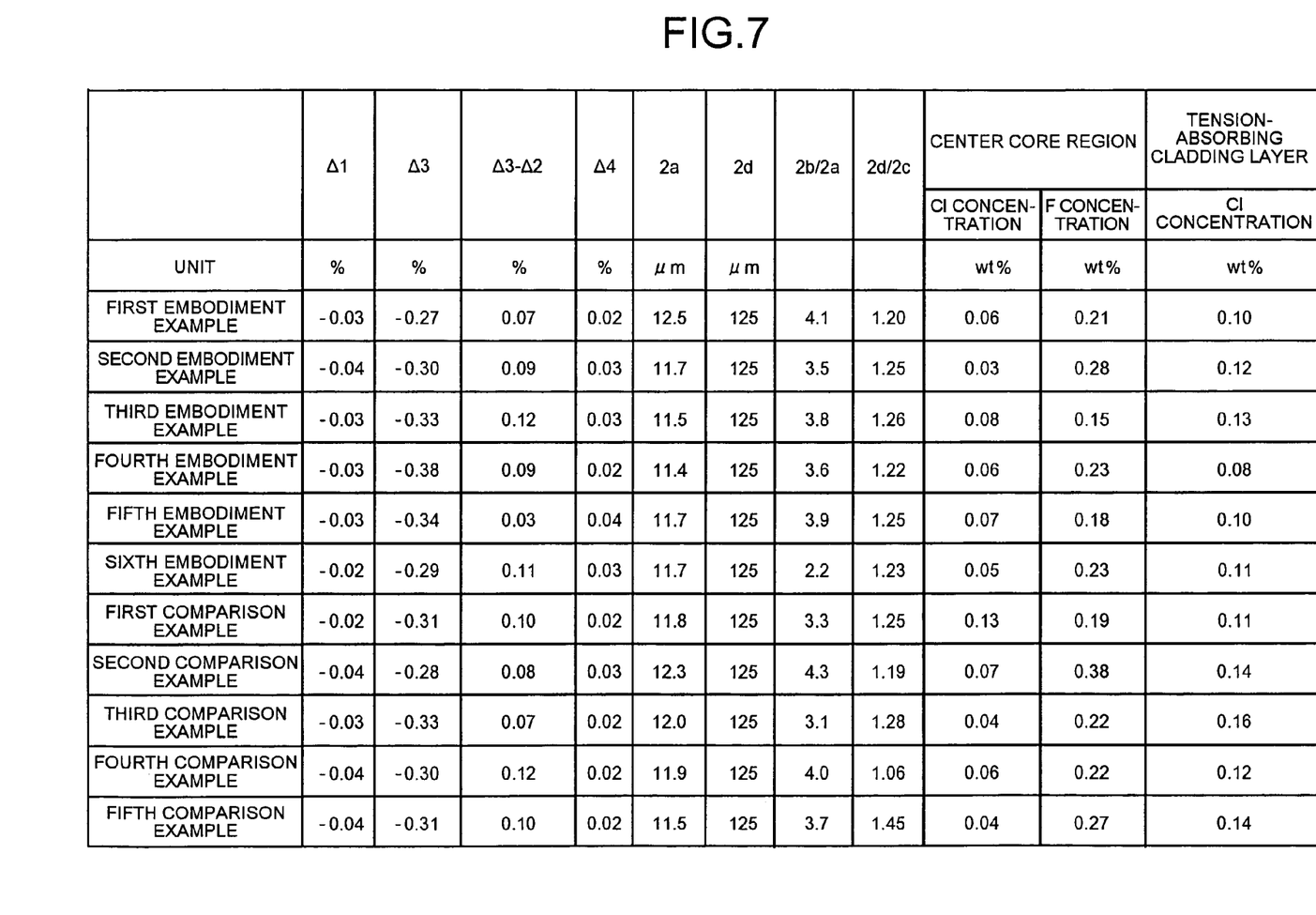
FIG. 7 is a diagram for showing design parameters for optical fibers according to a first to a sixth embodiment examples of the present invention and optical fibers according to a first to a fifth comparison examples, including $\Delta 1$, $\Delta 3$, ($\Delta 3 - \Delta 2$), $\Delta 4$, $2a$, $2d$, $2b/2a$, and $2d/2c$, the chlorine concentration and the fluorine concentration of the center core region, and the chlorine concentration of the tension-absorbing cladding layer.
Figure 8:
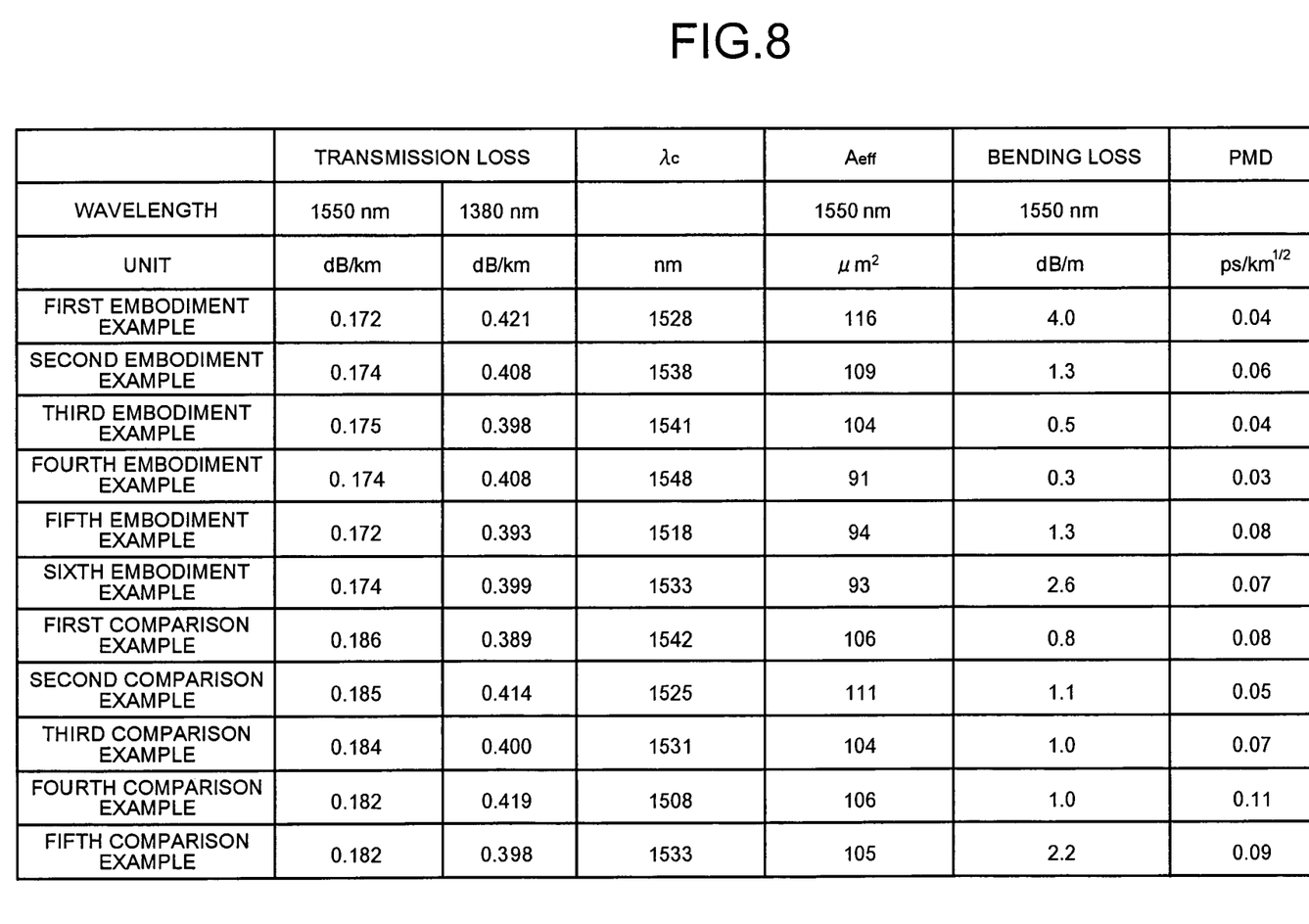
FIG. 8 is a diagram for showing the transmission loss at the wavelengths of 1550 nanometers and 1380 nanometers, the cutoff wavelength $\lambda_c$, the effective core area $A_{eff}$, the bending loss, and a polarization mode dispersion PMD, measured for the optical fibers according to the first to the sixth embodiment examples and the optical fibers according to the first to the fifth comparison examples.

FIG. 7 is a diagram for showing design parameters for optical fibers according to a first to a sixth embodiment examples of the present invention and optical fibers according to a first to a fifth comparison examples, including Δ1, Δ3, (Δ3−Δ2), Δ4, 2a, 2d, 2b/2a, 2d/2c, the chlorine concentration (Cl concentration) and the fluorine concentration (F concentration) of the center core region, and the chlorine concentration (Cl concentration) of the tension-absorbing cladding layer. FIG. 8 is a diagram for showing the transmission loss at the wavelengths of 1550 nanometers and 1380 nanometers, the cutoff wavelength $\lambda_c$, the effective core area $A_{eff}$, the bending loss, and the polarization mode dispersion PMD, measured for the optical fibers according to the first to the sixth embodiment examples and the optical fibers according to the first to the fifth comparison examples.

As shown in FIG. 7, for the optical fibers according to the first to the third embodiment examples, the parameters Δ1, Δ3, (Δ3−Δ2), Δ4, 2b/2a, 2d/2c, the Cl concentration and the F concentration of the center core region, and the Cl concentration of the tension-absorbing cladding layer are set to the same ranges as the optical fiber 10 according to the present embodiment. For the optical fibers according to the fourth to the sixth embodiment examples, the parameters other than Δ3, (Δ3−Δ2), and 2b/2a are set to the same ranges as the optical fiber 10 according to the present embodiment. As a result, as shown in FIG. 8, the optical fibers according to the first to the sixth embodiment examples have the transmission loss of equal to or lower than 0.50 dB/km at the wavelength of 1380 nanometers and the transmission loss of equal to or lower than 0.180 dB/km at the wavelength of 1550 nanometers. The cutoff wavelength is equal to or shorter than 1550 nanometers, the bending loss is equal to or lower than 10 dB/m when the optical fiber is wound 16 times with a diameter of 20 millimeters, and the polarization mode dispersion is equal to or less than 1.0 ps/km$^{1/2}$. Furthermore, the optical fibers according to the first to the third embodiment examples show the effective core area of equal to or larger than 100 μm² at the wavelength of 1550 nanometers.

On the other hand, as shown in FIG. 7, the optical fiber according to the first comparison example has a center core region with the Cl concentration higher than the case of the present embodiment, the optical fiber according to the second comparison example has a center core region with the F concentration higher than the case of the present embodiment, the optical fiber according to the third comparison example has a tension-absorbing cladding layer with the Cl concentration higher than the case of the present embodiment, the optical fiber according to the fourth comparison example has 2d/2c smaller than the case of the present embodiment, and the optical fiber according to the sixth comparison example has 2d/2c larger than the case of the present embodiment. As shown in FIG. 8, the optical fibers according to the first to the fifth comparison examples have the transmission loss higher than 0.180 dB/km at the wavelength of 1550 nanometers.

In addition, in the present embodiment, the refractive index profile of the optical fiber can be a dragging shape rounded at the time of manufacturing the optical fiber. Furthermore, although the W-type refractive index profile is employed in the present embodiment, the present invention is not limited to this scheme, but a single-peaked-type refractive index profile can also be employed.

As described above, according to one aspect of the present invention, because the center core region has a relative refractive index difference Δ1 of −0.1% to 0% with respect to a pure silica glass, a chlorine concentration of 0 wt % to 0.10 wt %, and a fluorine concentration of 0.10 wt % to 0.30 wt %, the tension-absorbing cladding layer has a relative refractive index difference Δ4 of 0% to 0.05% with respect to the pure silica glass and a chlorine concentration of equal to or lower than 0.15 wt %, and a ratio of an outer diameter of the tension-absorbing cladding layer to an outer diameter of the cladding layer is 1.10 to 1.40, the transmission loss due to the impurity, the structural defect, and the OH group in the center core region can be reduced, and at the same time, the structural defect caused by the residual stress in the center core region can be suppressed. Therefore, it is possible to realize an optical fiber having an extremely low transmission loss.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber comprising:
   a center core region;
   a cladding layer formed around the center core region, the cladding layer having a refractive index lower than a refractive index of the center core region;
   a tension-absorbing cladding layer formed around the cladding layer, the tension-absorbing cladding layer having a refractive index equal to or higher than the refractive index of the center core region, wherein
   the center core region has a relative refractive index difference $\Delta 1$ of $-0.1\%$ to $0\%$ with respect to a pure silica glass, a chlorine concentration of 0 wt % to 0.10 wt %, and a fluorine concentration of 0.10 wt % to 0.30 wt %,
   the tension-absorbing cladding layer has a relative refractive index difference $\Delta 4$ of 0% to 0.05% with respect to the pure silica glass and a chlorine concentration of equal to or lower than 0.15 wt %, and
   a ratio of an outer diameter of the tension-absorbing cladding layer to an outer diameter of the cladding layer is 1.10 to 1.40; and
   an inner cladding layer formed between the center core region and the cladding layer, the inner cladding layer having a refractive index lower than the refractive index of the cladding layer, wherein
   a relative refractive index difference $\Delta 3$ of the cladding layer with respect to the center core region is $-0.35\%$ to $-0.25\%$,
   a difference between the relative refractive index difference $\Delta 3$ and a relative refractive index difference $\Delta 2$ of the inner cladding layer with respect to the center core region, $\Delta 3 - \Delta 2$, is 0.05% to 0.20%, and
   a ratio of an outer diameter of the inner cladding layer to a diameter of the center core region is 3.0 to 4.5.

2. The optical fiber according to claim 1, wherein
   a transmission loss of the optical fiber at a wavelength of 1380 nanometers is 0.50 dB/km, and
   a transmission loss of the optical fiber at a wavelength of 1550 nanometers is 0.180 dB/km.

3. The optical fiber according to claim 1, wherein
   a cutoff wavelength of the optical fiber is equal to or shorter than 1550 nanometers, an effective core area of the optical fiber at the wavelength of 1550 nanometers is equal to or larger than 100 μm2,
   a bending loss of the optical fiber is equal to or lower than 10 dB/m when the optical fiber is wound 16 times with a diameter of 20 millimeters, and
   a polarization mode dispersion of the optical fiber is equal to or less than 1.0 ps/km1/2.

* * * * *